United States Patent
Alles et al.

[15] 3,636,849
[45] Jan. 25, 1972

[54] AUTOMATIC FOCUS CONTROL FOR A CAMERA

[72] Inventors: David Shepard Alles; John William Elek, both of Wescoesville; Benjamin Edward Nevis, Bethlehem; Wallace Albert Schlegel, Bath, all of Pa.

[73] Assignee: Bell Telephone Laboratories, Incorporated, Murray Hill, N.J.

[22] Filed: Jan. 28, 1970

[21] Appl. No.: 6,438

[52] U.S. Cl............................................95/45, 350/255
[51] Int. Cl. ...........................................................G03l 3/00
[58] Field of Search.............................350/252, 255; 95/45

[56] References Cited

UNITED STATES PATENTS 3,081,682  3/1963  Khoury........................................95/45
3,519,334  7/1970  Heitmann et al. ......................350/255

Primary Examiner—Samuel S. Matthews
Assistant Examiner—E. M. Bero
Attorney—R. J. Guenther and Edwin B. Cave

[57] ABSTRACT

A focus control for automatically maintaining the focus distance, i.e., lens-to-photoplate distance, of a camera within small tolerances utilizes gas-thrust bearings. The photoplate is mounted between two gas-thrust bearings called a lens bearing and a plate bearing. The lens bearing is very stiff and exerts a force which varies significantly with the float height; whereas, the plate bearing is very soft and exerts a force which is essentially independent of float height. Photoplate surface contours or irregularities are accommodated by a change in float height of the plate bearing while a substantially constant lens-to-photoplate surface distance is maintained by the stiff lens bearing.

6 Claims, 3 Drawing Figures

PATENTED JAN 25 1972 3,636,849

INVENTORS
D.S. ALLES
J.W. ELEK
B.E. NEVIS
W.A. SCHLEGEL

BY
ATTORNEY

AUTOMATIC FOCUS CONTROL FOR A CAMERA

BACKGROUND OF THE INVENTION

1. Field of the Invention

This invention relates to camera focus control means and, more particularly, to focus controls suitable for use in industrial cameras such as step-and-repeat cameras.

2. Description of Prior Art

There are numerous applications for precision cameras. Among these applications is the making of integrated circuit masks wherein the camera is known as a step-and-repeat camera. In this particular application, in order to produce repeatable, sharply defined, and equally sized circuit mask images on the photosensitive surface of the photographic plate, it is necessary to maintain the distance between the camera lens and the surface of the photoplate to within plus or minus 0.4 microns. The surface of the photographic plate or photoplate may deviate from a planar surface by as much as 0.5 to 1.0 microns per inch of distance along the plate. Thus, as the camera steps from position to form the mask images on the photoplate, it would be very desirable to have a focus control which would automatically maintain a constant lens-to-photoplate surface distance by compensating for such deviations from a planar surface.

Some cameras presently used for such applications as described for the step-and-repeat camera utilizes screw-type adjustments or other types of mechanical drives to control the lens-to-photoplate surface distance, i.e., the focus distance. The focus distance may be measured by apparatus such as an interferometer and used to control the mechanical drives. However, these mechanical control means are not completely satisfactory because of such factors as the speed of response and the hystersis effects which adversely affect repeatability. Gas-thrust bearings or air bearings have been previously used in cameras; however, there has been no known use of a combination of air bearings having specified characteristics to automatically control the camera focus distance.

Therefore, it is an objective of this invention to improve the means for maintaining focus control in precision cameras.

Another objective is to enhance the ability of focus control means to maintain a constant focus distance by automatically making adjustments for surface irregularities in the photoplate.

SUMMARY OF THE INVENTION

The foregoing objectives and others are achieved in accordance with the principles of the invention by the utilization of gas-thrust bearings having certain characteristics to adjustably support the photoplate.

The movable photoplate is mounted between two gas-thrust bearings or air bearings called the lens bearing and the plate bearing. The weight of the photoplate is supported at an initial equilibrium position between the bearings by a very soft spring and diaphragm arrangement. The lens bearing is rigidly maintained to fixed lens housing whereas the plate bearing may advantageously be flexibly maintained or supported by a pneumatic drive. The lens bearing is designed to be very stiff and to operate on a portion of its load-float height characteristic curve where the load varies significantly with float height. The plate bearing is designed to be very soft and to operate on a portion of its load-float height characteristic curve where the load is essentially independent of float height. Therefore, the plate bearing applies a substantially constant force to one side of the photoplate regardless of variations in the position of the photoplate. Thus surface irregularities in the photoplate are automatically accommodated by a change in float height of the plate bearing while the photosensitive surface is forced to remain a substantially constant distance from the lens by the stiff lens bearing in order to achieve the required force equilibrium.

DESCRIPTION OF THE DRAWINGS

The invention will be more readily comprehended from the following detailed description and accompanying drawings in which.

DETAILED DESCRIPTION

Figure 1:
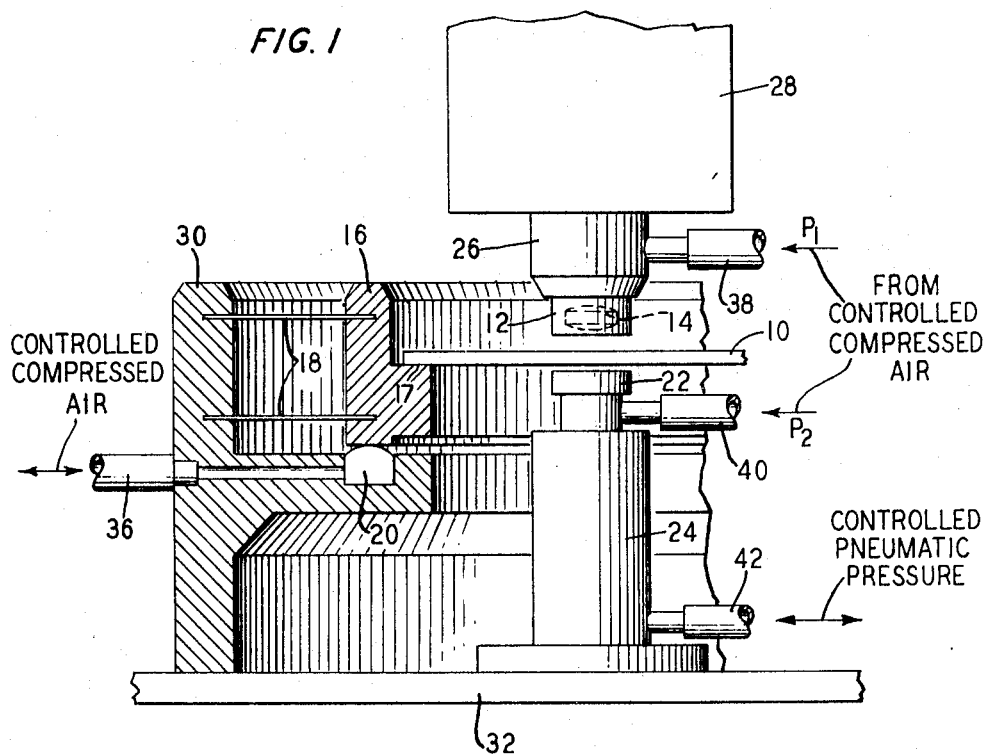
FIG. 1 is a partly sectional schematic representation of the automatic focus control of this invention.

FIG. 1 shows a photoplate 10, which may be coated with an appropriate photosensitive substance such as an emulsion and upon which images are to be formed, fixedly mounted in a plate holder 16. For example, photoplate 10 can be clamped to a shoulder 17 around the inner periphery of holder 16 so that holder 16 moves with photoplate 10. The plate holder 16 is connected to a base 30 through a very soft spring arrangement which might advantageously comprise parallel flexures or springs 18 and a flexible diaphragm 20. Although only one side or portion of this mounting arrangement is shown in detail in FIG. 1, springs 18 and diaphragm 20 advantageously extend full circle and thus support holder 16 around the entire periphery thereof. The parallel flexures 18 and diaphragm 20 support the weight of photoplate 10 and holder 16 at some designed or initial equilibrium position and prevent photoplate 10 from rotating during any movement thereof. The low pressure within the diaphragm 20, derived from a regulated pressure source through conductor 36, may be varied to account for any variation in weight between different photoplates.

The photoplate 10 is mounted between two gas-thrust bearings designated as the lens bearing 12 and the plate bearing 22. The lens bearing 12 advantageously surrounds the camera lens 14 and is rigidly mounted to the camera lens housing 26 which is attached to an appropriate frame 28. The plate bearing 22 is very flexibly mounted to and supported pneumatic drive 24. The entire camera apparatus is supported by an appropriate surface 32, such as a polished granite base.

Figure 2:
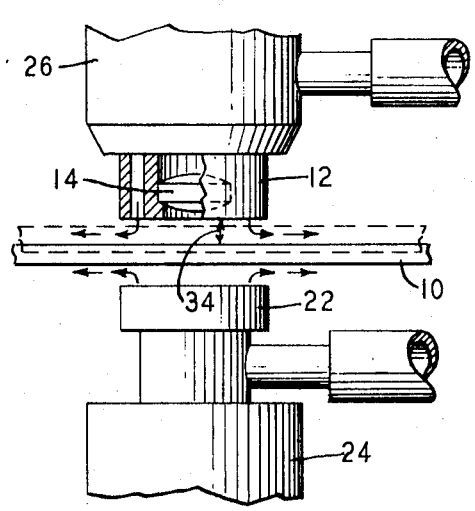
FIG. 2 is an enlarged partly sectional view of schematically represented gas-thrust bearings and a photoplate maintained therebetween.

As shown more fully in FIG. 2, the photoplate 10 is held at some initial equilibrium position between lens bearing 12 and plate bearing 22 by the soft diaphragm 20 and the parallel flexures 18 previously described. This initial equilibrium position is adjusted so that the lens-to-photoplate surface distance, i.e., distance 34, is precisely that required for the formation of precision images on the photoplate 10. At this point all forces on photoplate 10 are balanced.

As previously mentioned, the photoplate 10 has surface irregularities which would cause an unacceptable variation in the lens-to-photoplate surface distance as the camera steps or moves along the photoplate 10 unless compensation is made therefor. The surface irregularities may be due to such things as variations in emulsion thickness and the surface contours in the basic photoplate 10. The irregularities may cause as much as 0.5 to 1.0 microns variation from a true planar surface per inch of travel along photoplate 10. Thus, in the case of the step-and-repeat camera for making integrated circuit masks, the focus control system must compensate for these variations and hold the lens-to-photoplate surface distance constant to within plus or minus 0.4 microns. This is accomplished by designing the lens bearing 12 and the plate bearing 22 with the proper characteristics.

Figure 3:
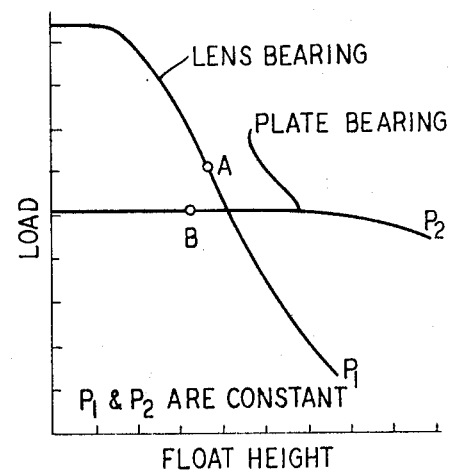
FIG. 3 is a series of load versus float height characteristic curves for gas-thrust bearings at some constant pressure.

FIG. 3 shows the load versus float height characteristic curve for the two gas-thrust bearings at some constant pressure. These curves shown are one of a family of constant pressure characteristic curves for each bearing. The characteristic of a gas-thrust bearing depends upon such things as a geometrical shape of gas orifices and the operating pressure as is well known in the art. In this invention the lens bearing 12 is designed to work on a portion of its characteristic curve where the load varies significantly with the float height, e.g., point A. Another way of expressing this is to say that the lens bearing 12 operates at a point where it has substantial stiffness. Thus, it is apparent from the characteristic curve that if the distance 34 between the lens bearing 12 and photoplate 10, which is directly related to the critical lens-to-photoplate surface distance, decreases as shown in FIG. 2, the force on the top of photoplate 10 will increase. This will tend to force the photoplate away from the bearing 12. Conversely, if the distance between lens bearing 12 and photoplate 10 increases, the force exerted by the lens bearing 12 decreases.

The plate bearing 22, on the other hand, is designed to operate at some point, such as point B, on its characteristic curve where the load is essentially independent of float height. That is, the stiffness of plate bearing 22 is negligible. Thus, plate bearing 22 will always exert an essentially constant force on photoplate 10 regardless of the distance between the bearing 22 and the photoplate 10. Therefore, it is apparent that the two bearings 12 and 22, acting in conjunction, will tend to maintain the photoplate 10 in its equilibrium focus position. For example, assume that the photoplate 10 has a surface irregularity which decreases the distances between lens bearing 12 and the photoplate location where the image is to be formed when the camera is moved from one position to the next during the image making process. The force exerted by lens bearing 12 on photoplate 10 will increase while the force exerted by the plate bearing 22 on the photoplate 10 remains constant. The forces on photoplate 10 are no longer in equilibrium and the photoplate 10 will be forced away from the lens bearing 12 until an equilibrium position is reached at which point the photoplate remains stationary. This equilibrium position corresponds with the infocus position of the photoplate 10. The bearings 12 and 22 are designed to apply a force only to a small area around the area of interest. Thus the photoplate 10 will tend to always have its particular location or section of interest at a given time in focus, i.e., the lens-to-photoplate surface distance will remain constant regardless of irregularities in the photoplate 10 or emulsion surfaces.

In practice the requirement that plate bearing 22 have negligible stiffness applies only to the situation where the plate bearing 22 is rigidly fastened to a support. In the embodiment illustrated in FIG. 1, wherein plate bearing 22 is flexibly supported by a relatively soft pneumatic drive 24, the plate bearing 22 may have, and indeed advantageously should have, some finite stiffness. However, the combination of the soft pneumatic drive 24 with a constant pressure and a bearing 22 with a finite stiffness gives the same effect as a rigidly mounted bearing 22 of negligible stiffness. This results because the pneumatic drive plate bearing combination will follow the motion of the photoplate 10 and maintain a constant pressure thereon.

The pressure to the bearings 12 and 22 and pneumatic drive 24 can easily be controlled within the required tolerances. The pressure to bearings 12 and 22 is derived from a regulated pressure source through conductors 38 and 40 respectively. The pressure to drive 24 is from a regulated source through a conductor 42. It appears that pressure regulation to within approximately one percent of a constant value is sufficient for even the highly accurate focus control required in the step-and-repeat camera. Such regulations can be obtained with commercially available pressure regulators.

As has been previously discussed, the stiffness of the diaphragm 20 and the parallel flexures 18 should be very small with respect to the stiffness of the lens bearing 12. A stiffness ratio of approximately 1/100 should be satisfactory for most applications. This insures that the diaphragm 20 and the parallel flexures 18 will not adversely affect the gas-thrust bearings 12 and 22 in maintaining a constant focus distance. A more exact determination of the desired stiffness for diaphragm 20 and flexures 18 can be made by performing a static force analysis after specific values of stiffness for bearings 12 and 22 and the weight of photoplate 10 have been determined.

It is to be understood that the embodiment disclosed herein is merely illustrative of the principles of the invention. Various modifications thereto might be made by those skilled in the art without departing from the spirit and scope of the invention.

What is claimed is:

1. Apparatus for maintaining a constant focus distance between a camera lens and a surface of a photographic plate by compensating for variations in said plate as said plate moves relative to said lens comprising, in combination, first and second gas-thrust bearings having opposed surfaces between which said plate is mounted, said first gas bearing applying a first force in a first direction to said plate, said first force being substantially proportional to the distance between said lens and said surface, said second gas bearing applying a second force to said plate in a second direction opposite to said first direction, said second force being substantially independent of said distance between said lens and said surface, said first and second forces causing said plate to move between said opposed surfaces until said first and second forces are in equilibrium said first and second forces being in equilibrium when said distance between said lens and said surface equals said focus distance, whereby said focus distance is automatically maintained at a constant value.

2. Apparatus in accordance with claim 1 including holding means for mounting said plate between said opposed surfaces of said bearings in an initial equilibrium position corresponding to said focus distance for an initial portion of said plate, said holding means moving with said plate as said first and second forces cause said plate to move to subsequent equilibrium positions corresponding to said focus distance for subsequent portions of said plate, and means for supporting said holding means from a fixed base so that said plate remains parallel to said opposed surfaces during movement of said plate, said supporting means having a relatively small stiffness.

3. Apparatus in accordance with claim 2 wherein said first bearing has a stiffness at least 100 times greater than said stiffness of said supporting means so that said supporting means has a negligible effect on said movement of said plate.

4. Apparatus in accordance with claim 2 wherein said supporting means comprises parallel flexure springs and an inflatable diaphragm.

5. Apparatus in accordance with claim 1 wherein said second bearing is supported by a pneumatic support having a relatively low stiffness.

6. Apparatus for maintaining a constant focus distance between a camera lens and a surface of a photographic plate during relative motion of said lens with respect to said plate comprising, in combination, first means for applying a first force to said plate, said first force being proportional to the distance of said surface from said lens, and second means for applying a second force to said plate in a direction opposite of said first force, said second force being substantially independent of said distance of said surface from said lens said first and second forces causing said plate to move between said first and second means until said first and second forces are in equilibrium, said first and second forces being in equilibrium when said distance between said lens and said surface equals said focus distance, whereby said focus distance is automatically maintained at a constant value.

* * * * *